US012304038B2

(12) United States Patent
Dai et al.

(10) Patent No.: US 12,304,038 B2
(45) Date of Patent: May 20, 2025

(54) ELECTRIC TOOL AND CONTROL METHOD THEREOF (71) Applicant: MOBILETRON ELECTRONICS CO., LTD., Taichung (TW)

(72) Inventors: Po-Kai Dai, Pingtung County (TW); Wei-Hsiu Li, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 8 days.

(21) Appl. No.: 18/542,784

(22) Filed: Dec. 18, 2023

(65) Prior Publication Data

US 2024/0227137 A1 Jul. 11, 2024

(30) Foreign Application Priority Data

Jan. 5, 2023 (TW) ................................. 112100424

(51) Int. Cl.
| | |
|---|---|
| *B25B 21/02* | (2006.01) |
| *B25B 23/147* | (2006.01) |
| *H02P 1/02* | (2006.01) |
| *H02P 6/08* | (2016.01) |
| *H02P 6/15* | (2016.01) |
| *H02P 6/30* | (2016.01) |
| *B25F 5/00* | (2006.01) |

(Continued)

(52) U.S. Cl.
CPC ............ *B25B 23/147* (2013.01); *B25B 21/02* (2013.01); *H02P 1/02* (2013.01); *H02P 6/08* (2013.01); *H02P 6/15* (2016.02); *H02P 6/30* (2016.02); *B25F 5/008* (2013.01); *H02P 6/17* (2016.02); *H02P 6/28* (2016.02)

(58) Field of Classification Search
CPC ......... B25B 21/00; B25B 21/02; B25B 23/14; B25B 23/147; B25B 23/1475; B25F 5/008; H02P 1/02; H02P 1/028; H02P 1/04; H02P 1/22; H02P 3/02; H02P 6/08; H02P 6/15; H02P 6/17; H02P 6/28; H02P 6/30
USPC .......... 173/1, 2, 176, 217, 178, 213; 318/17, 318/139, 281, 434
See application file for complete search history.

(56) References Cited

U.S. PATENT DOCUMENTS 5,831,402 A * 11/1998 Yang ....................... B25B 23/14
318/434
6,401,837 B1 * 6/2002 Pan .......................... B25F 3/00
173/217

(Continued)

*Primary Examiner* — Scott A Smith
(74) *Attorney, Agent, or Firm* — Apex Juris, pllc; Tracy M Heims; Cera Oh (57) ABSTRACT An electric tool includes a motor, a drive shaft, a torque sensing module, and a control device. A control method of the electric tool includes: driving the motor to rotate a rotating shaft in a direction of rotation through the control device; driving the motor in a plurality of first start-stop cycles through the control device when the control device determines that an increase in the torque sensed by the torque sensing module; driving the motor in a plurality of second start-stop cycles through the control device when the control device determines that the torque sensed by the torque sensing module has increased to a first predetermined torque and is less than a second predetermined torque. Therefore, in the process of tightening or loosening a workpiece, the discomfort felt by the hands of the user due to reaction forces during increasing the torque could be effectively reduced.

24 Claims, 8 Drawing Sheets (51) Int. Cl.
*H02P 6/17* (2016.01)
*H02P 6/28* (2016.01)

(56) References Cited

U.S. PATENT DOCUMENTS

| | | | |
|---|---|---|---|
| 6,536,536 B1* | 3/2003 | Gass | B25F 5/021 |
| | | | 173/171 |
| 10,171,011 B2* | 1/2019 | Takano | H02P 1/028 |
| 10,646,986 B2* | 5/2020 | Teranishi | B25D 17/24 |
| 11,557,991 B2* | 1/2023 | Dai | H02P 6/17 |
| 2003/0089511 A1* | 5/2003 | Tsuneda | B25B 21/00 |
| | | | 173/217 |
| 2009/0295313 A1* | 12/2009 | Suzuki | H02H 7/0838 |
| | | | 318/400.18 |
| 2010/0308764 A1* | 12/2010 | Suzuki | H02P 6/12 |
| | | | 318/494 |
| 2011/0180286 A1* | 7/2011 | Oomori | H02K 9/06 |
| | | | 173/217 |
| 2013/0008679 A1* | 1/2013 | Nishikawa | B25B 21/02 |
| | | | 173/93 |
| 2013/0193881 A1* | 8/2013 | Muto | B25B 21/00 |
| | | | 318/139 |
| 2014/0015383 A1* | 1/2014 | Kokinelis | H02P 31/00 |
| | | | 310/68 A |

* cited by examiner

ELECTRIC TOOL AND CONTROL METHOD THEREOF

BACKGROUND OF THE INVENTION

Technical Field

The present invention relates generally to an electric tool, and more particularly to an electric tool without a clutch mechanism and a control method of the electric tool.

Description of Related Art

It is known that traditional electric tools, such as electronic torque screwdrivers without a clutch mechanism or electronic torque wrenches, allow a user to set a torque value and use the user-defined torque setting to tighten screws, nuts, and other workpieces. When the torque applied to the workpiece reaches the user-defined torque setting, a motor of the electric tool immediately stops rotating. This ensures that the workpiece is tightened to the user-defined torque setting.

Nevertheless, during the process of tightening the workpiece, the user must apply force to counter the rotational force generated by the electric tool to maintain the stability of holding the electric tool. However, as the torque required for tightening the workpiece increases, the reaction force exerted on the hands of the user also increases, leading to discomfort, especially in the wrist.

The same situation also occurs when loosening the fastened workpiece. The tighter the workpiece is fastened, the higher the torque is required to rotate the workpiece, resulting in the discomfort in the hands of the user due to the greater reaction force.

Therefore, the design of the traditional electric tools still has room for improvement.

BRIEF SUMMARY OF THE INVENTION

In view of the above, the primary objective of the present invention is to provide an electric tool and a control method of the electric tool, which could reduce the discomfort experienced by the user when tightening or loosening a workpiece by using the electric tool.

The present invention provides the electric tool includes a motor, a drive shaft, a torque sensing module, and a control device; the motor has a rotating shaft; the drive shaft is coupled to the rotating shaft; the torque sensing module is adapted to sense a torque on the drive shaft; the control device is electrically connected to the motor and the torque sensing module. Driving the motor to rotate the rotating shaft in a direction of rotation through the control device, and driving the motor in a plurality of first start-stop cycles through the control device when the control device determines that an increase in the torque sensed by the torque sensing module occurs, wherein each of the plurality of first start-stop cycles has a first cycle time; the first cycle time includes a first enabling time and a first ending time; the control device drives the motor to rotate the rotating shaft during the first enabling time and stops the rotating shaft of the motor from rotating during the first ending time; the plurality of first cycle time of the plurality of first start-stop cycles gradually increase, and the plurality of first enabling time gradually increase. Then, driving the motor in a plurality of second start-stop cycles through the control device when the control device determines that the torque sensed by the torque sensing module has increased to a first predetermined torque and is less than a second predetermined torque, wherein each of the plurality of second start-stop cycles has a second cycle time; the second cycle time includes a second enabling time and a second ending time; the control device drives the rotating shaft of the motor to rotate during the second enabling time and stops the rotating shaft of the motor from rotating during the second ending time; the plurality of second cycle time of the plurality of second start-stop cycles remain fixed, while the plurality of second enabling time gradually increase and the plurality of second ending time gradually decrease.

The present invention also provides a control method of an electric tool, the electric tool includes a motor, a drive shaft, a torque sensing module, and a control device; the motor has a rotating shaft; the drive shaft is coupled to the rotating shaft; the torque sensing module is adapted to sense a torque on the drive shaft; the control device is electrically connected to the motor and the torque sensing module; the control method comprises steps of:

A. driving the motor to rotate the rotating shaft in a direction of rotation through the control device;

B. driving the motor in a plurality of first start-stop cycles through the control device when the control device determines that an increase in the torque sensed by the torque sensing module occurs, wherein each of the plurality of first start-stop cycles has a first cycle time; the first cycle time includes a first enabling time and a first ending time; the control device drives the motor to rotate the rotating shaft during the first enabling time and stops the rotating shaft of the motor from rotating during the first ending time; the plurality of first cycle time of the plurality of first start-stop cycles gradually increase, and the plurality of first enabling time gradually increase;

C. driving the motor in a plurality of second start-stop cycles through the control device when the control device determines that the torque sensed by the torque sensing module has increased to a first predetermined torque and is less than a second predetermined torque, wherein each of the plurality of second start-stop cycles has a second cycle time; the second cycle time includes a second enabling time and a second ending time; the control device drives the rotating shaft of the motor to rotate during the second enabling time and stops the rotating shaft of the motor from rotating during the second ending time; the plurality of second cycle time of the plurality of second start-stop cycles remain fixed, while the plurality of second enabling time gradually increase and the plurality of second ending time gradually decrease.

By using the above-mentioned electric tool and the control method of the electric tool during the process of tightening or loosening a workpiece, the discomfort experienced by the hands of the user due to reaction forces when encountering the increased torque could be effectively reduced.

BRIEF DESCRIPTION OF THE SEVERAL VIEWS OF THE DRAWINGS

The present invention would be best understood by referring to the following detailed description of some illustrative embodiments in conjunction with the accompanying drawings, in which.

DETAILED DESCRIPTION OF THE INVENTION

Figure 1:
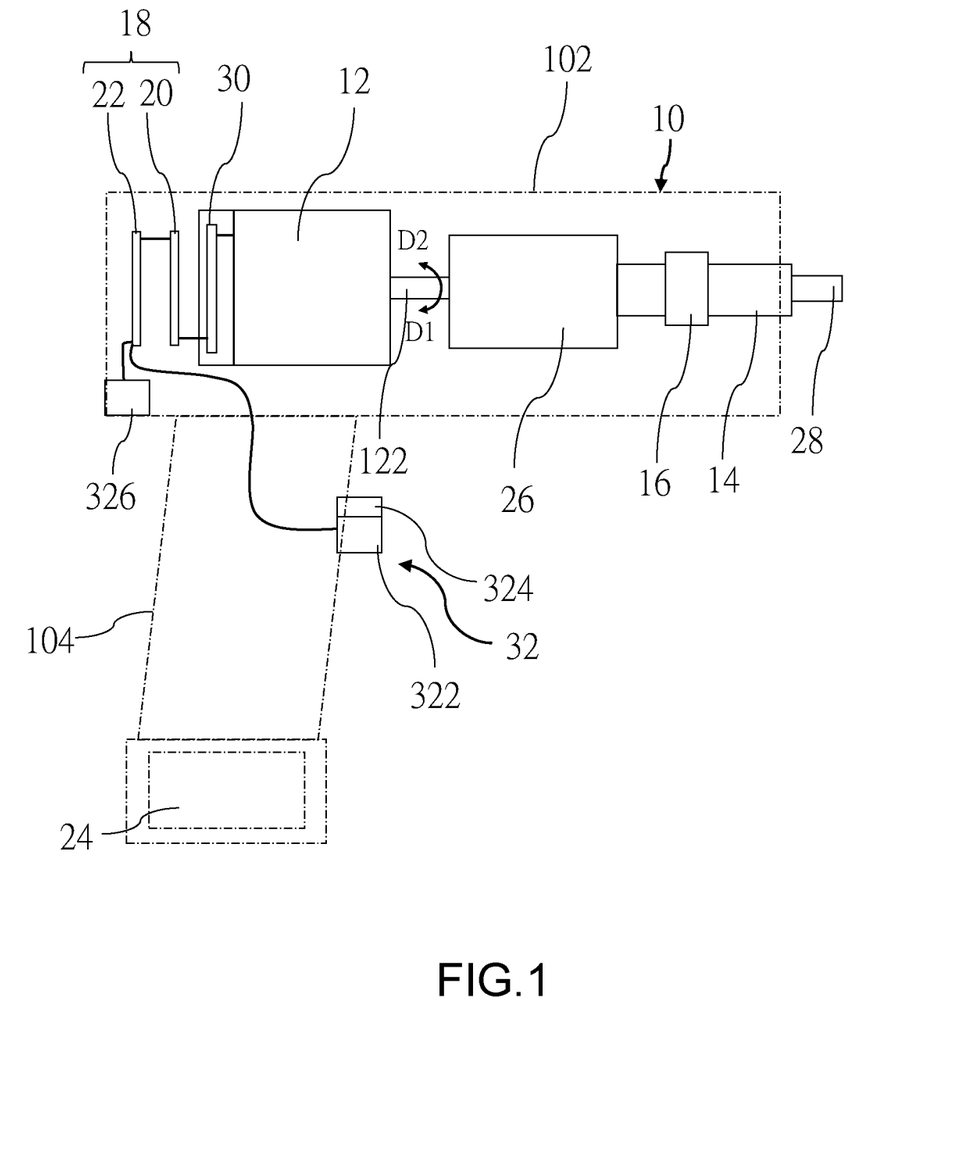
FIG. 1 is a schematic view of the electric tool according to a first embodiment of the present invention.
Figure 2:
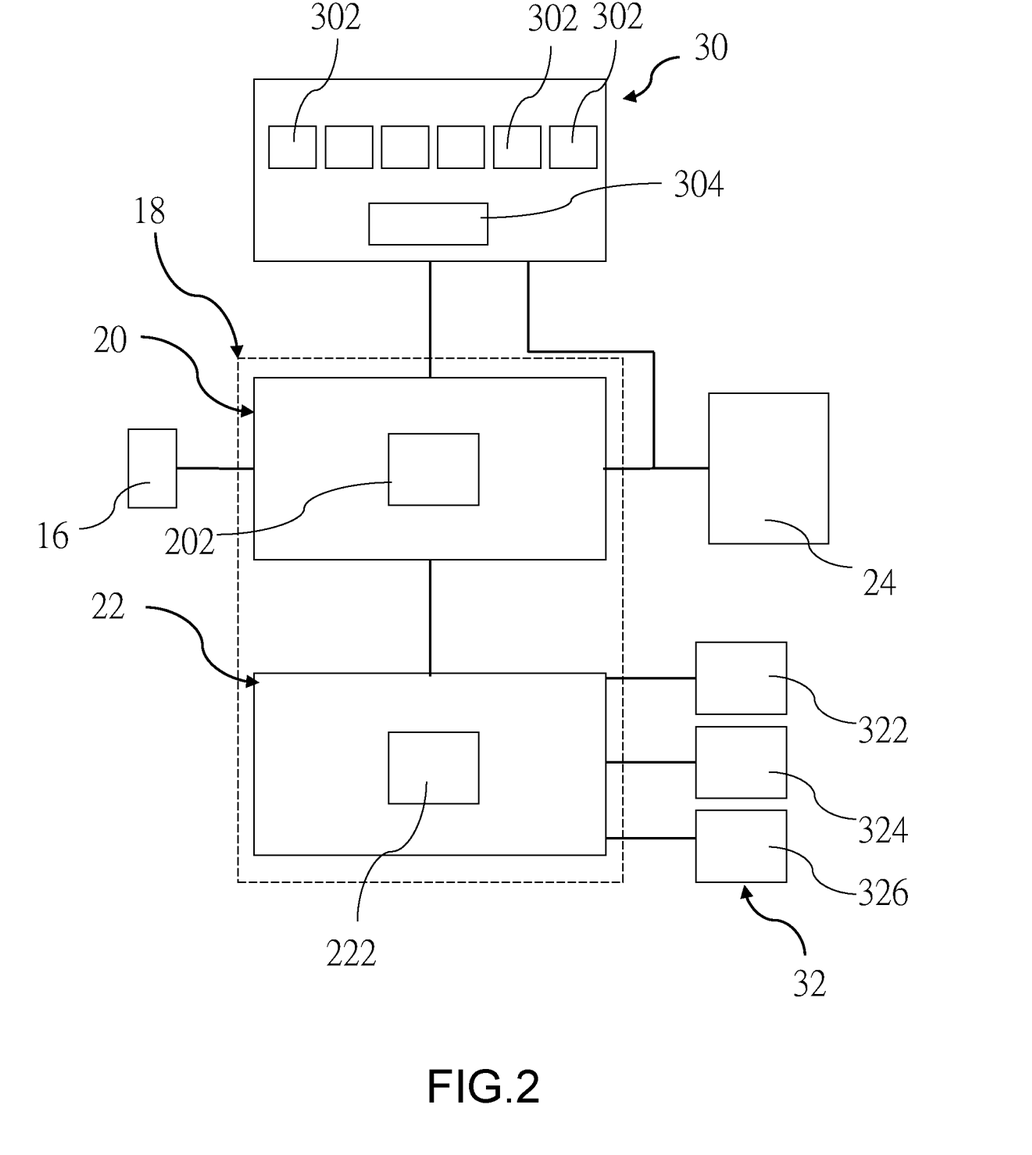
FIG. 2 is a block diagram of the electric tool according to the first embodiment of the present invention.

An electric tool according to a first embodiment of the present invention is illustrated in FIG. 1 and FIG. 2 and includes a housing 10, a motor 12, a drive shaft 14, a torque sensing module 16, and a control device 18. The electric tool does not have a clutch mechanism.

In this embodiment, the housing 10 includes a handle 102 and a transmission portion 104. The handle 102 is engaged with a bottom of the transmission portion 104, and a longitudinal direction of the handle 102 intersects with a longitudinal direction of the transmission portion 104, but not limited thereto; the longitudinal direction of the handle 102 and the longitudinal direction of the transmission portion 104 might also be aligned along the same axis. The handle 102 is designed for a user to grip. A battery 24 is disposed on a bottom of the handle 102.

The motor 12 is disposed in the transmission portion 104 and has a rotating shaft 122. In this embodiment, the motor 12 is a three-phase brushless DC motor.

The drive shaft 14 is coupled to the rotating shaft 122 of the motor 12. In this embodiment, the drive shaft 14 is coupled to the rotating shaft 122 of the motor 12 through a speed reducer 26. The speed reducer 26 could be, for example, a planetary gear reducer. The drive shaft 14 could accommodate a mechanism head 28. The mechanism head 28 is used to rotate a workpiece, such as a screw or a nut. For example, the mechanism head 28 could be designed in the shape of an external hex head, an internal hex head, a cross head, or a flat head to drive screws with corresponding shapes.

The torque sensing module 16 is coupled to the drive shaft 14 and is used to measure a torque applied to the drive shaft 14. In this embodiment, the torque sensing module 16 is disposed on the drive shaft 14, but not limited thereto; the torque sensing module 16 could be disposed at any location to indirectly sense the torque on the drive shaft 14; for instance, the torque sensing module 16 could be placed on the speed reducer 26 and coupled to the drive shaft 14 through the speed reducer 26.

The control device 18 is electrically connected to the motor 12 and the torque sensing module 16. The control device 18 drives the rotating shaft 122 of the motor 12 to rotate. In this embodiment, the control device 18 drives the motor 12 through a drive module 30. The drive module 30 has a plurality of commutation switch components 302 and a gate driver 304. The plurality of commutation switch components 302 are electrically connected to the motor 12. The control device 18 is electrically connected to the motor 12 through the drive module 30. By controlling the gate driver 304 of the drive module 30 to switch the commutation switch components 302, the control device 18 drives the rotating shaft 122 of the motor 12 to rotate.

The control device 18 has two control circuit boards as an example, namely a first control circuit board 20 and a second control circuit board 22. The first control circuit board 20 is equipped with a first controller 202, and the second control circuit board 22 is equipped with a second controller 222. The first controller 202 and the second controller 222 could be, for example, microprocessors. In practice, the two control circuit boards could be integrated into one control circuit board and the two controllers could be combined into a single controller.

The first control circuit board 20 is electrically connected to the torque sensing module 16 and the drive module 30. The second control circuit board 22 is electrically connected to the first control circuit board 20 and an operational interface 32, so that the second control circuit board 22 receives power from the first control circuit board 20, and the second controller 222 transmits an operational command to the first controller 202.

The operational interface 32 includes an enabling switch 322, a direction switch 324, and a torque setter 326. The enabling switch 322 is operated by the user to output a start signal to the second controller 222. The direction switch 324 is operated by the user to switch between a forward rotation state and a reverse rotation state, thereby outputting a direction signal to the second controller 222. The direction signal is either a forward rotation signal or a reverse rotation signal. The torque setter 326 allows the user to set a target torque required for tightening the workpiece. The second controller 222 transmits the set target torque to the first controller 202. The second controller 222 generates the operational command corresponding to the forward rotation signal or the reverse rotation signal and sends the operational command to the first controller 202 based on the start signal and the direction signal.

The control device 18 operates in either a first rotational mode or a second rotational mode based on the operational command. In this embodiment, when the first controller 202 receives the operational command corresponding to the forward rotation signal, the first controller 202 operates in the first rotational mode; when the first controller 202 receives the operational command corresponding to the reverse rotation signal, the first controller 202 operates in the second rotational mode. The first rotational mode is used to control the drive module 30 to drive the rotating shaft 122 of the motor 12 to rotate in a first direction of rotation D1 for tightening the workpiece. The second rotational mode is used to control the drive module 30 to drive the rotating shaft 122 of the motor 12 to rotate in a second direction of rotation D2 for loosening the workpiece.

After the user sets the target torque by using the torque setter 326, switches the direction switch 324 to the forward rotation state, and presses the enabling switch 322, the first operation mode is activated to tighten the workpiece.

Figure 3:
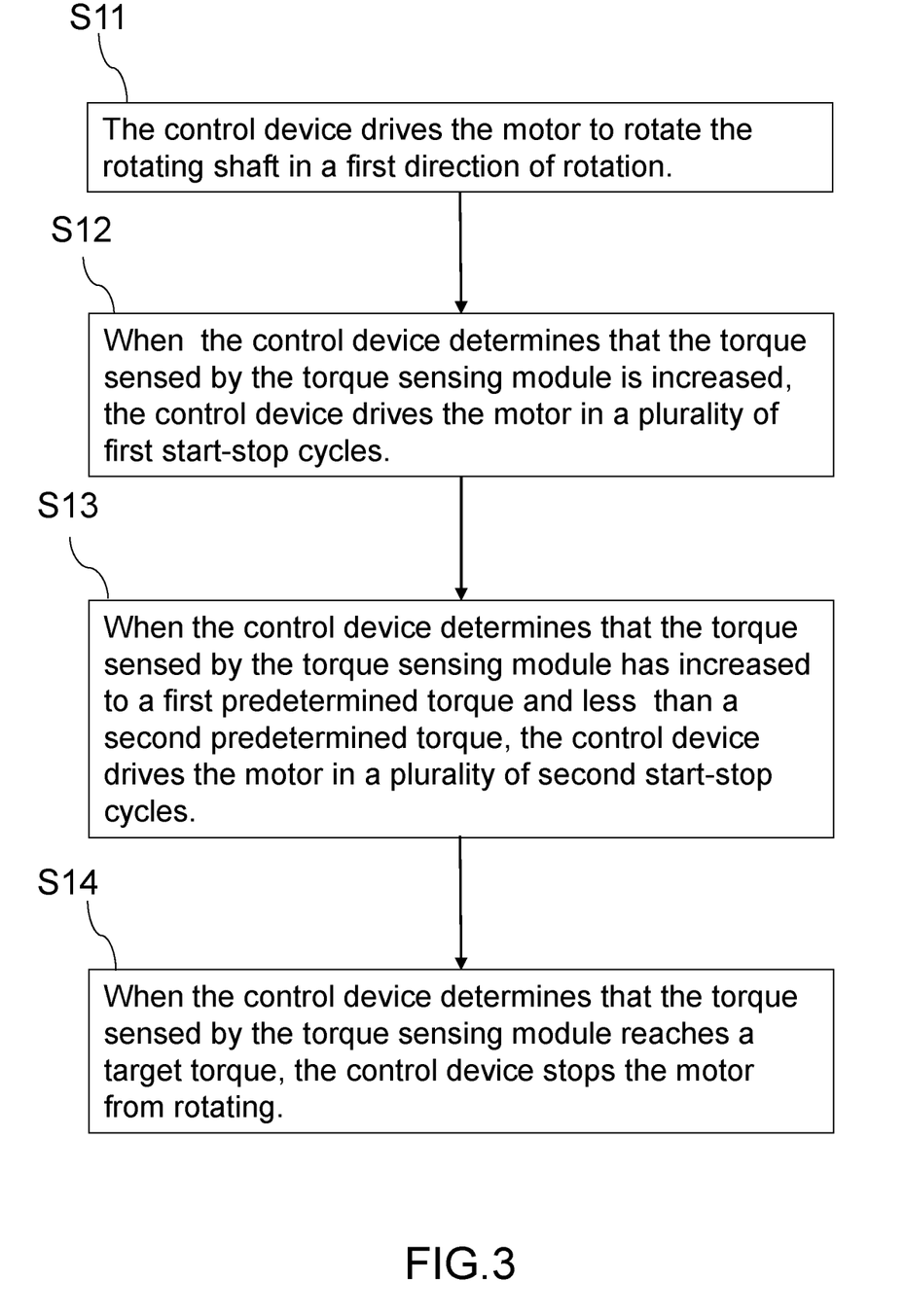
FIG. 3 is a flowchart of the first rotational mode of the control method of the electric tool according to the first embodiment of the present invention.

A control method of the electric tool of this embodiment operating in the first operation mode includes the following steps as shown in FIG. 3.

Step S11: The control device 18 drives the motor 12 to rotate the rotating shaft 122 in a direction of rotation (the first direction of rotation D1). In this embodiment, the first controller 202 controls the drive module 30 to operate the motor 12, thereby causing the rotating shaft 122 to rotate in the first direction of rotation D1. The rotating shaft 122 drives the drive shaft 14 to rotate through the speed reducer 26, thereby rotating the workpiece.

Figure 4:
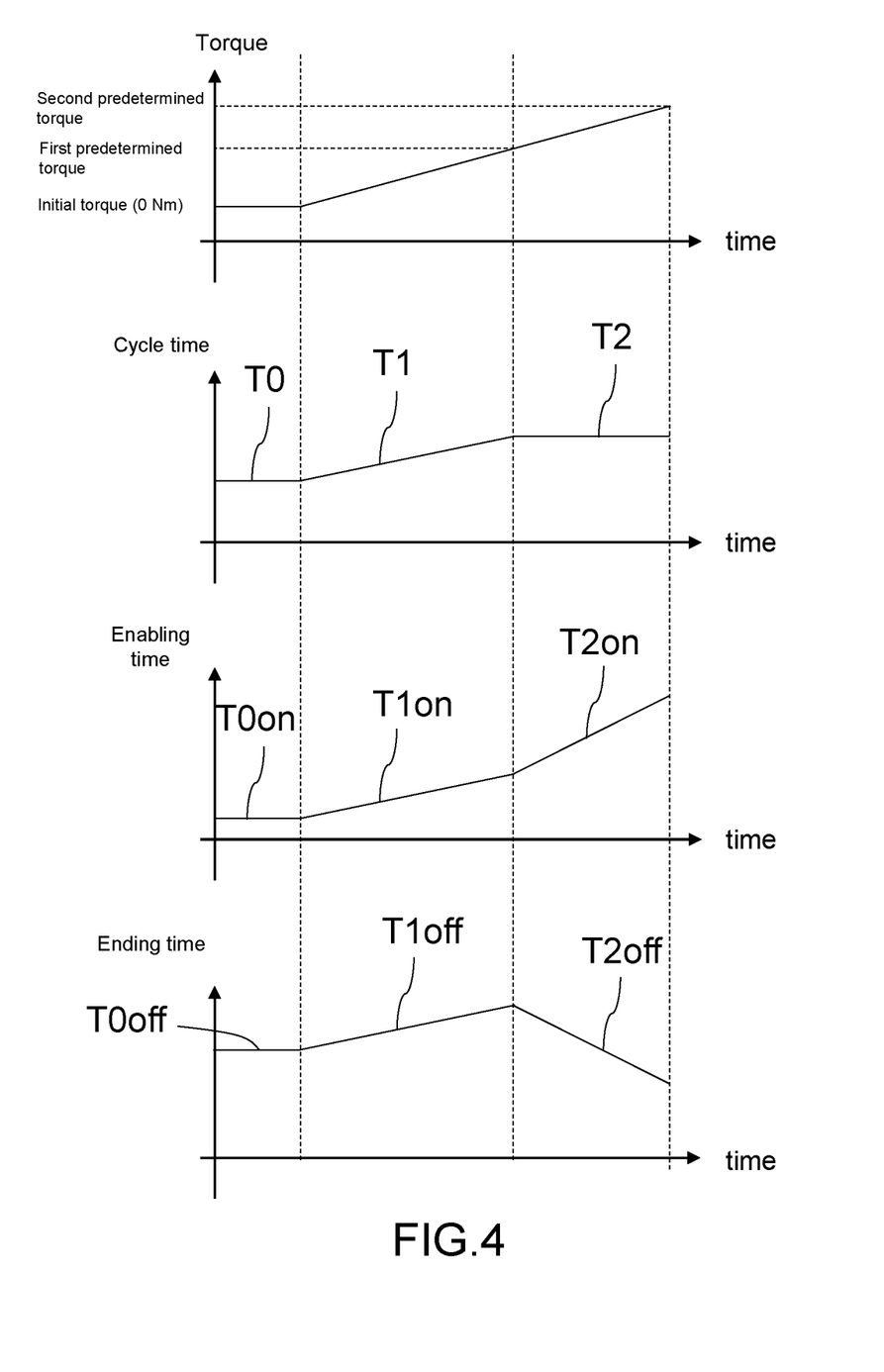
FIG. 4 is a schematic view, showings curves of the torque sensed by the torque sensing module, the cycle time, the enabling time, and the ending time when fastening the workpiece according to the first embodiment of the present invention.

As shown in FIG. 4, the first controller 202 controls the drive module 30 to operate the motor 12 with a fixed initial cycle time T0 and controls the drive module 30 to drive the rotating shaft 122 of the motor 12 to rotate at a fixed rotational speed. At the beginning of the rotation, the torque sensed by the torque sensing module 16 is an initial torque, wherein the initial torque is, for example, 0 Nm. The initial cycle time T0 has an initial enabling time T0on and an initial ending time T0off. The control device 18 drives the rotating shaft 122 of the motor 12 to rotate during the initial enabling time T0on and stops the motor 12 from rotating during the initial ending time T0off. In this embodiment, the initial cycle time T0 could range from 25 ms to 40 ms, the initial enabling time T0on could range from 5 ms to 15 ms, and the initial ending time T0off could range from 20 ms to 25 ms. For example, the initial cycle time T0 is 33 ms, the initial enabling time T0on is 10 ms, and the initial ending time T0off is 23 ms.

Step S12: When the control device 18 determines that the torque sensed by the torque sensing module 16 is increased, the control device 18 drives the motor 12 in a plurality of first start-stop cycles.

Figure 5:
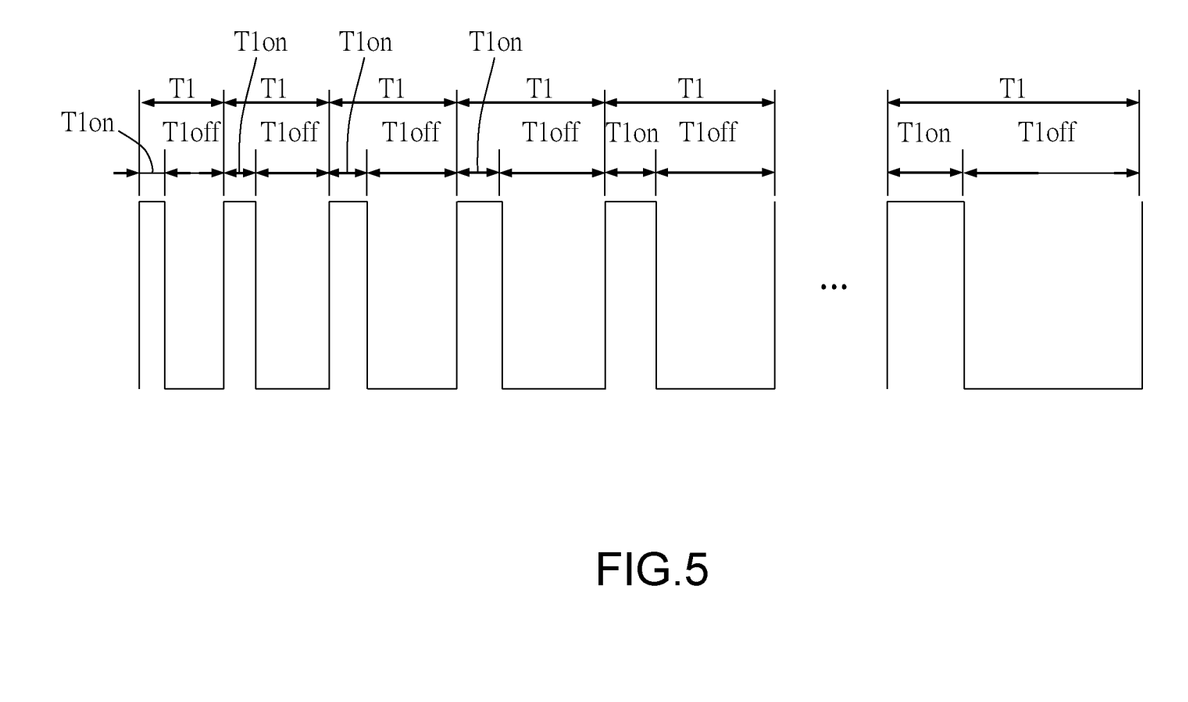
FIG. 5 is a schematic view showing the plurality of first start-stop cycles according to the first embodiment of the present invention.

As the resistance experienced by the workpiece gradually increases, the torque applied to the drive shaft 14 is started being generated. Therefore, the torque sensed by the torque sensing module 16 increases. Referring to FIG. 4 and FIG. 5, when the first controller 202 determines that the torque sensed by the torque sensing module 16 is increased, the first controller 202 controls the drive module 30 to drive the motor 12 in the continuous plurality of first start-stop cycles. Each of the first start-stop cycles has a first cycle time T1, wherein the first cycle time T1 includes a first enabling time T1on and a first ending time T1off. In each of the first start-stop cycles, the control device 18 drives the rotating shaft 122 of the motor 12 to rotate during the first enabling time T1on and stops the rotating shaft 122 of the motor 12 during the first ending time T1off. Each of the first cycle time T1 gradually increases starting from the initial cycle time T0.

The plurality of first cycle time T1 of the first start-stop cycles increase gradually, and the plurality of first enabling time T1on increase gradually as well. In this embodiment, the plurality of first ending time T1off of the first start-stop cycles gradually increase starting from the plurality of initial ending time T0off. Preferably, each of the first start-stop cycles has a first duty cycle, wherein the first duty cycles of the first start-stop cycles are identical; each of the first duty cycles fall within a range of 25% to 35%. In this embodiment, the first duty cycle is set at 30%. The first cycle time T1 and the first enabling time T1on of the first start-stop cycles increase gradually with the increase in the torque sensed by the torque sensing module 16, thereby achieving the purpose that the output of the motor 12 follows the increase in the torque, but it's not limited to this configuration. In other embodiments, the plurality of first cycle time T1 and the plurality of first enabling time T1on of the first start-stop cycles could also increase with time.

In more detail, a corresponding relationship (i.e., a first corresponding relationship) is established in the first controller 202 of the control device 18, wherein the first corresponding relationship is related to the changes in the torque sensed by the torque sensing module 16 and the plurality of first cycle time T1. The first corresponding relationship could be, for example, a lookup table that records different torque values and the corresponding first cycle time T1, or a mathematical formula expressing the relationship between the torque and the first cycle time T1. The control device 18 retrieves the first cycle time T1 of each of the first start-stop cycles based on the torque sensed by the torque sensing module 16 and the first corresponding relationship, for example, by looking up the torque values in the lookup table or calculating by using the formula to obtain the corresponding first cycle time T1. The control device 18 then subtracts each of the first ending time T1off from each of the first cycle time T1 to determine the first enabling time T1on of each of the first start-stop cycles. Ideally, the first duty cycles are maintained the same. For instance, the control device 18 might obtain a first cycle time T1 and a corresponding first enabling time T1on at regular sampling intervals by using the first corresponding relationship, drive the rotating shaft 122 of the motor 12 to rotate during the first enabling time T1on and stop the rotating shaft 122 of the motor 12 during a first ending time T1off following the first enabling time T1on.

In practice, the first corresponding relationship could also be related to the change in the torque sensed by the torque sensing module 16 and the change of the plurality of first enabling time T1on. The first corresponding relationship could be, for example, a lookup table recording different torque values and different first enabling time T1on, or a mathematical formula representing the relationship between the torque and the first enabling time T1on. The control device 18 obtains each of the first enabling time T1on based on the torque sensed by the torque sensing module 16 and the first corresponding relationship. For example, the control device 18 might obtain a first enabling time T1on at regular sampling intervals by using the first corresponding relationship, drive the rotating shaft 122 of the motor 12 to rotate during the first enabling time T1on, and stop the rotating shaft 122 of the motor 12 from rotating during a first ending time T1off following the first enabling time T1on.

The plurality of first cycle time of the first start-stop cycles gradually increase. Therefore, the force transmitted from the motor 12 through the drive shaft 14 to the workpiece creates vibrations, and the vibration frequency gradually slows down as the sensed torque increases in conjunction with the increasing first enabling times T1on, which indicates the output from the motor 12 gradually increases. In this way, the workpiece is intermittently tapped, the tapping speed slows down gradually, and the tapping force increases from small to large, so that the workpiece is continuously tightened to a first predetermined torque, thereby effectively reducing the discomfort of the hand of the user due to reaction forces.

In this embodiment, when the control device 18 determines that the torque sensed by the torque sensing module 16 has not reached the first predetermined torque and the first cycle time T1 of any one of the first start-stop cycles has already increased to an upper limit cycle time, the control device 18 maintains the subsequent first cycle times T1 of the subsequent first start-stop cycles at the upper limit cycle time and no longer increases the subsequent first enabling times T1on, thereby preventing the tapping speed from becoming too slow and causing discomfort. In this embodiment, the upper limit cycle time could range from 60 ms to 70 ms; for example, the upper limit cycle time is 66 ms; at that time the first enabling time T1on is 19.8 ms, and the first ending time T1off is 46.2 ms.

Step S13: When the control device 18 determines that the torque sensed by the torque sensing module 16 has increased to the first predetermined torque and is less than a second predetermined torque, the control device 18 drives the motor 12 in a plurality of second start-stop cycles.

Figure 6:
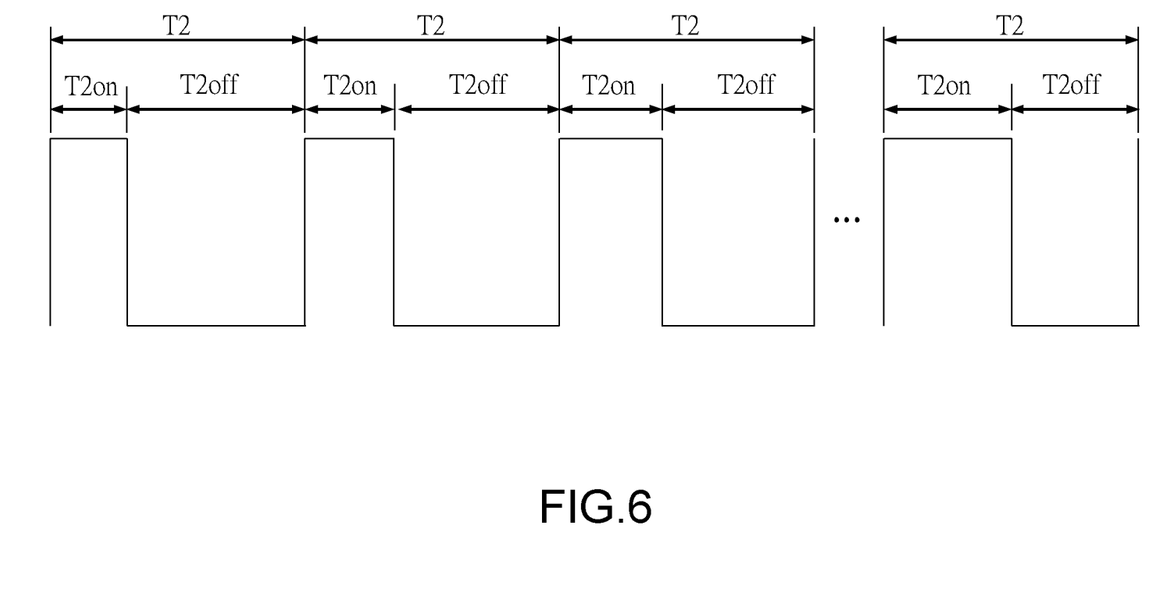
FIG. 6 is a schematic view showing the plurality of second start-stop cycles according to the first embodiment of the present invention.

Referring to FIG. 4 and FIG. 6, when the first controller 202 determines that the torque sensed by the torque sensing module 16 has increased to the first predetermined torque, the first controller 202 then switches to control the drive module 30 to drive the motor 12 in the continuous plurality of second start-stop cycles. Each of the second start-stop cycles has a second cycle time T2. The second cycle time T2 includes a second enabling time T2on and a second ending time T2off. The second cycle time T2 is equal to the upper limit cycle time. In this embodiment, the second cycle time T2 could range from 60 ms to 70 ms; for example, the second cycle time T2 is 66 ms. In each of the second start-stop cycles, the control device 18 drives the motor 12 to rotate during the second enabling time T2on, and the control device 18 stops the motor 12 from rotating during the second ending time T2off. The plurality of second cycle time T2 of the second start-stop cycles remain fixed, and the plurality of second enabling time T2on gradually increase while the plurality of second ending time T2off gradually decrease. In other words, a plurality of second duty cycles gradually increases, wherein the second duty cycles are increased starting from the first duty cycle. The plurality of second enabling time T2on increase gradually with the increase in the torque sensed by the torque sensing module 16, while the plurality of second ending time T2off gradually decrease with the increase in the torque sensed by the torque sensing module 16, thereby achieving the purpose that the duty cycle of the motor 12 follows the increase in the torque, but not limited thereto. In other embodiments, the plurality of second enabling time T2on could also gradually increase over time, and the plurality of second ending time T2off could also gradually decrease over time.

In this embodiment, the second cycle time T2 is equal to the first cycle time T1 of the last first start-stop cycle or is equal to the upper limit cycle time, and the second predetermined torque is set to be equal to the user-defined target torque, but not limited thereto; the second predetermined torque could also be less than the target torque. A degree of the increase in the second enabling time T2on along with the increase in the torque sensed by the torque sensing module 16 is greater than a degree of the increase in the first enabling time T1on along with the increase in the torque sensed by the torque sensing module 16. The change in the plurality of second enabling time T2on and the change in the plurality of second ending time T2off are the same, thereby keeping the plurality of second cycle time T2 of the second start-stop cycles constant.

In more detail, a corresponding relationship (i.e., a second corresponding relationship) is established in the first controller 202 of the control device 18, wherein the second corresponding relationship is related to the changes in the torque sensed by the torque sensing module 16 and the plurality of second enabling time T2on. The second corresponding relationship could be, for example, a lookup table that records different torque values and the corresponding second enabling time T2on, or a mathematical formula expressing the relationship between the torque and the second enabling time T2on. The first controller 202 of the control device 18 retrieves the second enabling time T2on of each of the second start-stop cycles based on the torque sensed by the torque sensing module 16 and the second corresponding relationship, for example, by looking up the torque values in the lookup table or calculating by using the mathematical formula to obtain the corresponding second enabling time T2on. The control device 18 then subtracts each of the second enabling time T2on from each of the second cycle time T2 to determine the second ending time T2off of each of the second start-stop cycles. Ideally, the second duty cycle of the second start-stop cycles increases gradually. For instance, the control device 18 might obtain a second enabling time T2on and a corresponding second ending time T2off at regular sampling intervals by using the second corresponding relationship, and drive the rotating shaft 122 of the motor 12 to rotate during the second enabling time T2on and stop the rotating shaft 122 of the motor 12 during the second ending time T2off following the second enabling time T2on.

In practice, the second corresponding relationship could also be related to the change in the torque sensed by the torque sensing module 16 and the change of the plurality of second ending time T2off. The first controller 202 of the control device 18 obtains the second ending time T2off of each of the second start-stop cycles based on the torque sensed by the torque sensing module 16 and the second corresponding relationship. The first controller 202 of the control device 18 then subtracts each of the second ending time T2off from each of the second cycle time T2 to determine the second enabling time T2on of each of the second start-stop cycles.

The plurality of second cycle time of the second start-stop cycles remain constant. Therefore, the force transmitted from the motor 12 through the drive shaft 14 to the workpiece creates vibrations, and the vibration frequency remain constant in conjunction with the increasing second enabling time T2on, which indicates the output from the motor 12 gradually increases. In this way, the workpiece is intermittently tapped at a fixed frequency, and the tapping force gradually increases, so that the workpiece is continuously tightened to the higher second predetermined torque, thereby effectively reducing the discomfort experienced by the hand of the user due to the reaction force during a high torque phase.

In this embodiment, when the control device 18 determines that the second enabling time T2on of any one of the second start-stop cycles has reached an upper limit enabling time, or the second ending time T2off of any one of the second start-stop cycles has reached a lower limit ending time, the control device 18 maintains the following second enabling time T2on of the following second start-stop cycles at the upper limit enabling time, and the subsequent second ending time T2off remain at the lower limit ending time. The upper limit enabling time could be less than the second cycle time T2; for example, the upper limit enabling time is between 45% and 55% of the second cycle time T2, i.e., the second duty cycle is at most between 45% and 55%, preferably 50%, to maintain the effect of generating impacts.

During the process from the generation of the torque on the drive shaft 14 to the tightening of the workpiece, since the torque on the drive shaft 14 is not significant at the beginning, maintaining the first start-stop cycles at the fixed first duty cycle (25%-35%) helps to avoid driving the motor 12 with a larger duty cycle directly at the beginning of tightening the workpiece, thereby preventing the electric tool from producing excessive vibration. Subsequently, once the torque on the drive shaft 14 increases to the first predetermined torque, the second start-stop cycles gradually increase the duty cycle, so that the output of the motor 12 increases gradually, thereby achieving the purpose of continuously tightening the workpiece.

In this embodiment, the control method of the electric tool operating in the first operation mode could further include step S14. Step S14: When control device 18 determines that the torque sensed by the torque sensing module 16 reaches the target torque, the control device 18 stops the motor 12 from rotating.

In this embodiment, when the torque for tightening the workpiece reaches the target torque, the first controller 202 of the control device 18 stops the motor 12 from rotating, thereby tightening the workpiece to the target torque. In this embodiment, the first controller 202 sets the second predetermined torque to be equal to the target torque, so that when the first controller 202 determines that the torque sensed by the torque sensing module 16 increases to the second predetermined torque, the first controller 202 stops the motor 12 from rotating.

When the user wants to loosen the workpiece, the user switches the direction switch 324 to the reverse rotation state and presses the enabling switch 322, so that a second operation mode could be activated to loosen the workpiece.

Figure 7:
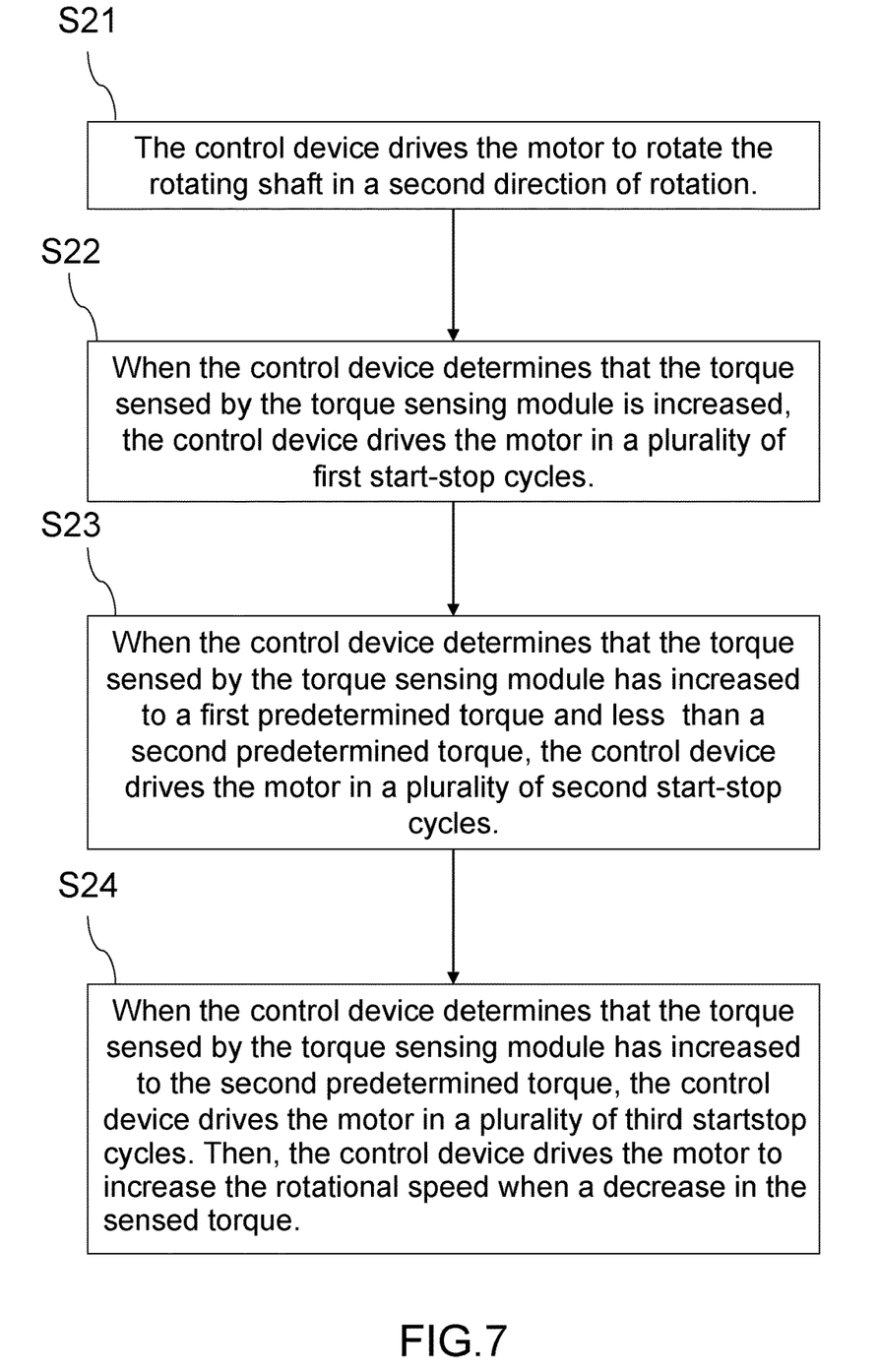
FIG. 7 is a flowchart of the second rotational mode of the control method of the electric tool according to the first embodiment of the present invention.

The control method of the electric tool of this embodiment operating in the second operation mode is explained as below and includes the following steps as shown in FIG. 7.

Figure 8:
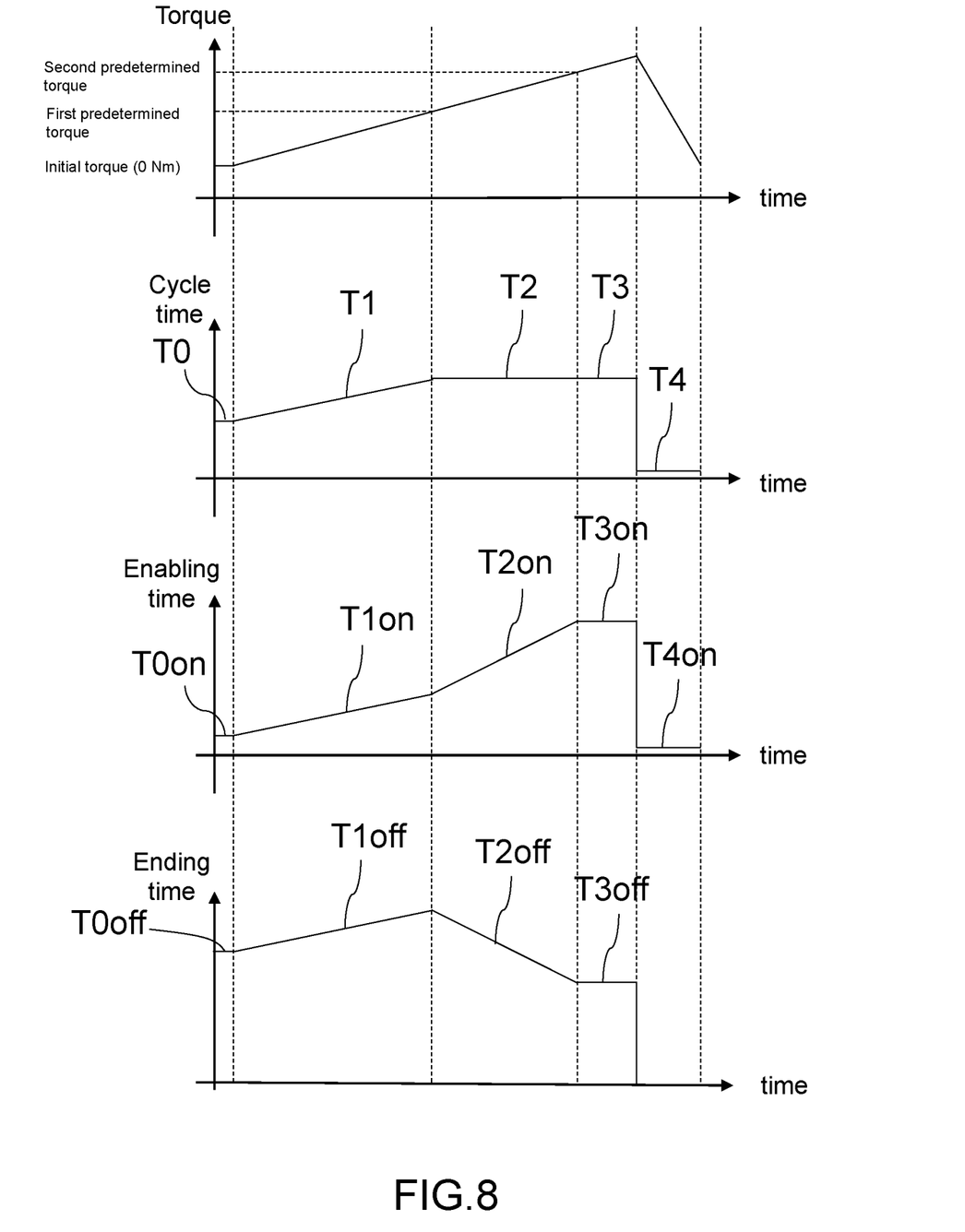
FIG. 8 is a schematic view, showing curves of the torque sensed by the torque sensing module, the cycle time, the enabling time, and the ending time when loosening the workpiece according to the first embodiment of the present invention.

Step S21: The control device 18 drives the motor 12 to rotate the rotating shaft 122 in another direction of rotation (the second direction of rotation D2). In this embodiment, the first controller 202 controls the drive module 30 to drive the motor 12 to rotate the rotating shaft 122 along the second direction of rotation D2. Referring to FIG. 8, at the beginning of the rotation, the torque sensed by the torque sensing module 16 is an initial torque. The initial torque is taken as 0 Nm, for example.

Step S22: When the control device 18 determines that the torque sensed by the torque sensing module 16 is increased, the control device 18 drives the motor 12 in the plurality of first start-stop cycles. In this embodiment, Step S22 is to the same as Step S12.

Step S23: When the control device 18 determines that the torque sensed by the torque sensing module 16 is increased to the first predetermined torque and is less than the second predetermined torque, the control device 18 drives the motor 12 in the second start-stop cycles. In this embodiment, Step S23 is similar to Step S13, except that the second predetermined torque in Step S23 is a default torque rather than the user-defined target torque.

During the process of loosening the workpiece, in step S22, the plurality of first cycle time T1 of the first start-stop cycles gradually increase. Therefore, the force transmitted from the motor 12 through the drive shaft 14 to the workpiece generates vibrations, and the vibration frequency gradually decreases as the sensed torque increases in conjunction with the increasing first enabling times T1on, which indicates the output from the motor 12 gradually increases. In this way, the workpiece is intermittently tapped, the tapping speed slows down gradually, and the tapping force increases from small to large, so that the workpiece is continuously loosed, thereby effectively reducing the discomfort of the hand of the user due to reaction forces. In step S23, the plurality of the second cycle time T2 of the second start-stop cycles remain fixed. Therefore, the force transmitted from the motor 12 through the drive shaft 14 to the workpiece generates vibrations, and the vibration frequency remains constant in conjunction with the gradual increase in the second enabling time T2on, i.e., the output of the motor 12 gradually increases. In this way, the workpiece is intermittently tapped at a fixed frequency and the tapping force gradually increase, so that the workpiece is continuously loosed, thereby effectively reducing the discomfort experienced by the hand of the user due to the reaction force during the high torque phase.

In this embodiment, the control method of the electric tool operating in the second operation mode could further include step S24. Step S24: When the control device 18 determines that the torque sensed by the torque sensing module 16 has increased to the second predetermined torque, the control device 18 drives the motor 12 in a plurality of third start-stop cycles when the control device 18 assesses a decrease in the torque sensed by the torque sensing module 16. Then, the control device 18 drives the motor 12 to increase the rotational speed of the rotating shaft 122 in the second direction of rotation D2.

Each of the third start-stop cycles has a third cycle time T3. The third cycle time T3 includes a third enabling time T3on and a third ending time T3off. The third cycle time T3 remains equal to the second cycle time T2, the third enabling time T3on remains equal to the second enabling time T2on of the last second start-stop cycle, and the third ending time T3off remains equal to the second ending time T2off of the last second start-stop cycle. A third duty cycle of the start-stop cycles remains equal to the maximum value of the second duty cycle of the start-stop cycles.

When the torque sensing module 16 detects a decrease in the torque, the workpiece has been loosened from a fastened state. At this point, the first controller 202 controls the drive module 30 to change the cycle time of the driving motor 12 from the third cycle time T3 to a fourth cycle time T4, and the first controller 202 controls the motor 12 to increase the rotational speed to accelerate the rotation of the workpiece. A fourth duty cycle of the fourth cycle time is, for example, 100%, that is, a fourth enabling time T4on is equal to the fourth cycle time T4. The fourth cycle time T4 is less than the third cycle time T3 as an example, but not limited thereto; the fourth cycle time T4 could also be equal to the third cycle time T3. When the second controller 222 detects the user releasing the enabling switch 322, the second controller 222 notifies the first controller 202 to stop the motor 12 from rotating.

According to the above description, through the electric tool and the control method of the electric tool provided by the invention, the discomfort experienced by the hands of the user due to reaction forces during the high torque phase could be effectively reduced when the torque is increased during the process of tightening the workpiece or loosening the workpiece.

It must be pointed out that the embodiments described above are only some preferred embodiments of the present invention. All equivalent structures which employ the concepts disclosed in this specification and the appended claims should fall within the scope of the present invention.

What is claimed is:
1. An electric tool comprising:
   a motor with a rotating shaft;
   a drive shaft coupled to the rotating shaft;
   a torque sensing module adapted to sense a torque on the drive shaft; and
   a control device electrically connected to the motor and the torque sensing module;

wherein the control device drives the motor to rotate the rotating shaft in a direction of rotation; when the control device determines that an increase in the torque sensed by the torque sensing module occurs, the control device drives the motor in a plurality of first start-stop cycles; each of the plurality of first start-stop cycles has a first cycle time, wherein the first cycle time includes a first enabling time and a first ending time; the control device drives the motor to rotate the rotating shaft during the first enabling time and stops the rotating shaft of the motor from rotating during the first ending time; the plurality of first cycle time of the plurality of first start-stop cycles gradually increase, and the plurality of first enabling time of the plurality of first start-stop cycles gradually increase; then, when the control device determines that the torque sensed by the torque sensing module has increased to a first predetermined torque and is less than a second predetermined torque, the control device drives the motor in a plurality of second start-stop cycles; each of the plurality of second start-stop cycles has a second cycle time, wherein the second cycle time includes a second enabling time and a second ending time; the control device drives the rotating shaft of the motor to rotate during the second enabling time and stops the rotating shaft of the motor from rotating during the second ending time; the plurality of second cycle time of the plurality of second start-stop cycles remain fixed, while the plurality of second enabling time of the plurality of second start-stop cycles gradually increase and the plurality of second ending time of the plurality of second start-stop cycles gradually decrease.

2. The electric tool as claimed in claim 1, wherein the plurality of first cycle time and the plurality of first enabling time of the plurality of first start-stop cycles increase gradually with the increase in the torque sensed by the torque sensing module; the plurality of second enabling time increase gradually with the increase in the torque sensed by the torque sensing module, while the plurality of second ending time gradually decrease with the increase in the torque sensed by the torque sensing module.

3. The electric tool as claimed in claim 2, wherein a degree of an increase in the plurality of second enabling time along with the increase in the torque sensed by the torque sensing module is greater than a degree of an increase in the plurality of first enabling time along with the increase in the torque sensed by the torque sensing module.

4. The electric tool as claimed in claim 1, wherein each of the plurality of first start-stop cycles has a first duty cycle; the first duty cycle of each of the plurality of first start-stop cycles is the same; each of the plurality of second start-stop cycles has a second duty cycle; the second duty cycle of each of the plurality of second start-stop cycles gradually increases.

5. The electric tool as claimed in claim 1, wherein the plurality of first ending time of the plurality of first start-stop cycles gradually increase.

6. The electric tool as claimed in claim 5, wherein when the control device determines that the torque sensed by the torque sensing module has not reached the first predetermined torque and the first cycle time of any one of the plurality of first start-stop cycles has already increased to an upper limit cycle time, the control device maintains the first cycle time of the plurality of first start-stop cycles, which are subsequent, at the upper limit cycle time and no longer increases the first enabling time of the subsequent plurality of first start-stop cycles.

7. The electric tool as claimed in claim 5, wherein a first corresponding relationship is established in the control device; the first corresponding relationship is related to a change in the torque sensed by the torque sensing module and a change in the plurality of first cycle time; the control device obtains the first cycle time of each of the plurality of first start-stop cycles based on the torque sensed by the torque sensing module and the first corresponding relationship, and the control device obtains the first enabling time of each of the plurality of first start-stop cycles by subtracting the corresponding first ending time from the obtained first cycle time.

8. The electric tool as claimed in the claim 5, wherein a first corresponding relationship is established in the control device; the first corresponding relationship is related to a change in the torque sensed by the torque sensing module and a change in the plurality of first enabling time; the control device obtains the first enabling time of each of the plurality of first start-stop cycles based on the torque sensed by the torque sensing module and the first corresponding relationship.

9. The electric tool as claimed in claim 1, wherein a second corresponding relationship is established in the control device; the second corresponding relationship is related to a change in the torque sensed by the torque sensing module and a change the plurality of second enabling time; the control device obtains the second enabling time of each of the plurality of second start-stop cycles based on the torque sensed by the torque sensing module and the second corresponding relationship, and the control device obtains the second ending time of each of the plurality of second start-stop cycle by subtracting the obtained second enabling time from the corresponding second cycle time.

10. The electric tool as claimed in claim 1, wherein when the control device determines that the second enabling time of any one of the plurality of second start-stop cycles has reached an upper limit enabling time or the second ending time of any one of the plurality of second start-stop cycles has reached a lower limit ending time, the control device maintains the second enabling time of the plurality of second start-stop cycles, which are subsequent, at the upper limit enabling time and maintains the second ending time of the subsequent plurality of second start-stop cycles at the lower limit ending time.

11. The electric tool as claimed in claim 1, wherein when the control device determines that the torque sensed by the torque sensing module reaches a target torque, the control device stops the rotating shaft of the motor from rotating.

12. The electric tool as claimed in claim 1, wherein when the control device determines that the torque sensed by the torque sensing module has increased to the second predetermined torque, the control device drives the motor in a plurality of third start-stop cycles and then the control device drives the motor to increase a rotational speed of the rotating shaft of the motor in the direction of rotation when the control device assesses a decrease in the torque sensed by the torque sensing module; each of the plurality of third start-stop cycles has a third cycle time; wherein the third cycle time includes a third enabling time and a third ending time; the control device drives the rotating shaft of the motor to rotate during the third enabling time and stops the rotating shaft of the motor from rotating during the third ending time; the third cycle time is equal to the second cycle time; the third enabling time is equal to the second enabling time of one of the plurality of second start-stop cycles that is the last, and the third ending time is equal to the second ending time of the last second start-stop cycle.

13. A control method of an electric tool, wherein the electric tool comprises a motor, a drive shaft, a torque sensing module, and a control device; the motor has a rotating shaft; the drive shaft is coupled to the rotating shaft; the torque sensing module is adapted to sense a torque on the drive shaft; the control device is electrically connected to the motor and the torque sensing module; the control method comprises steps of:
- A. driving the motor to rotate the rotating shaft in a direction of rotation through the control device;
- B. driving the motor in a plurality of first start-stop cycles through the control device when the control device determines that an increase in the torque sensed by the torque sensing module occurs, wherein each of the plurality of first start-stop cycles has a first cycle time; the first cycle time includes a first enabling time and a first ending time; the control device drives the motor to rotate the rotating shaft during the first enabling time and stops the rotating shaft of the motor from rotating during the first ending time; the plurality of first cycle time of the plurality of first start-stop cycles gradually increase, and the plurality of first enabling time of the plurality of first start-stop cycles gradually increase;
- C. driving the motor in a plurality of second start-stop cycles through the control device when the control device determines that the torque sensed by the torque sensing module has increased to a first predetermined torque and is less than a second predetermined torque, wherein each of the plurality of second start-stop cycles has a second cycle time; the second cycle time includes a second enabling time and a second ending time; the control device drives the rotating shaft of the motor to rotate during the second enabling time and stops the rotating shaft of the motor from rotating during the second ending time; the plurality of second cycle time of the plurality of second start-stop cycles remain fixed, while the plurality of second enabling time of the plurality of second start-stop cycles gradually increase and the plurality of second ending time of the plurality of second start-stop cycles gradually decrease.

14. The control method of the electric tool as claimed in claim 13, wherein step B, the plurality of first cycle time and the plurality of first enabling time of the plurality of first start-stop cycles increase gradually with the increase in the torque sensed by the torque sensing module; in step C, the plurality of second enabling time increase gradually with the increase in the torque sensed by the torque sensing module, while the plurality of second ending time gradually decrease with the increase in the torque sensed by the torque sensing module.

15. The control method of the electric tool as claimed in claim 14, wherein a degree of an increase in the plurality of second enabling time along with the increase in the torque sensed by the torque sensing module is greater than a degree of an increase in the plurality of first enabling time with the increase in the torque sensed by the torque sensing module.

16. The control method of the electric tool as claimed in claim 13, wherein each of the plurality of first start-stop cycles has a first duty cycle; the first duty cycle of each of plurality of the first start-stop cycles is the same; each of the plurality of second start-stop cycles has a second duty cycle; the second duty cycle of each of the plurality of second start-stop cycles gradually increases.

17. The control method of the electric tool as claimed in claim 13, wherein in step B, the plurality of first ending time of the plurality of first start-stop cycles remain fixed.

18. The control method of the electric tool as claimed in claim 17, wherein in step B, when the control device determines that the torque sensed by the torque sensing module has not reached the first predetermined torque and the first cycle time of any one of the plurality of first start-stop cycles has already increased to an upper limit cycle time, the control device maintains the first cycle time of the plurality of first start-stop cycles, which are subsequent, at the upper limit cycle time and no longer increases the first enabling time of the subsequent plurality of first start-stop cycles.

19. The control method of the electric tool as claimed in claim 17, wherein a first corresponding relationship is established in the control device; the first corresponding relationship is related to a change in the torque sensed by the torque sensing module and a change in the plurality of first cycle time; in step B, the control device obtains the first cycle time of each of the plurality of first start-stop cycles based on the torque sensed by the torque sensing module and the first corresponding relationship and obtains the first enabling time of each of the plurality of first start-stop cycles by subtracting the corresponding first ending time from the obtained first cycle time.

20. The control method of the electric tool as claimed in claim 17, wherein a first corresponding relationship is established in the control device; the first corresponding relationship is related to a change in the torque sensed by the torque sensing module and a change in the plurality of first enabling time; in step B, the control device obtains the first enabling time of each of the plurality of first start-stop cycles based on the torque sensed by the torque sensing module and the first corresponding relationship.

21. The control method of the electric tool as claimed in claim 13, wherein a second corresponding relationship is established in the control device; the second corresponding relationship is related to a change in the torque sensed by the torque sensing module and a change the plurality of second enabling time; in step C, the control device obtains the second enabling time of each of the plurality of second start-stop cycles based on the torque sensed by the torque sensing module and the second corresponding relationship, and the control device obtains the second ending time of each of the plurality of second start-stop cycles by subtracting the obtained second enabling time from the corresponding second cycle time.

22. The control method of the electric tool as claimed in claim 13, wherein in step C, when the control device determines that the second enabling time of any one of the plurality of second start-stop cycles has reached an upper limit enabling time or the second ending time of any one of the plurality of second start-stop cycles has reached a lower limit ending time, the control device maintains the second enabling time of the plurality of second start-stop cycles, which are subsequent, at the upper limit enabling time and maintains the second ending time of the subsequent plurality of second start-stop cycles at the lower limit ending time.

23. The control method of the electric tool as claimed in claim 13, further comprising stopping, through the control device, the rotating shaft of the motor from rotating when the control device determines the torque sensed by the torque sensing module reaches a target torque after step C.

24. The control method of the electric tool as claimed in claim 13, wherein after step C, the control method further comprises driving, through the control device, the motor in a plurality of third start-stop cycles when the control device determines that the torque sensed by the torque sensing module has increased to the second predetermined torque and then driving, through the control device, the motor to increase a rotational speed of the rotating shaft of the motor in the direction of rotation when the control device assesses a decrease in the torque sensed by the torque sensing module; each of the plurality of third start-stop cycles has a third cycle time, wherein third cycle time includes a third enabling time and a third ending time; the control device drives the rotating shaft of the motor to rotate during the third enabling time and stops the rotating shaft of the motor from rotating during the third ending time; the third cycle time is equal to the second cycle time, the third enabling time is equal to the second enabling time of one of the plurality of second start-stop cycles that is the last, and the third ending time is equal to the second ending time of the last second start-stop cycle.

* * * * *